(12) United States Patent
Bintz et al.

(10) Patent No.: US 10,584,598 B2
(45) Date of Patent: Mar. 10, 2020

(54) COMPLAINT CANTILEVERED AIRFOIL

(71) Applicant: UNITED TECHNOLOGIES CORPORATION, Hartford, CT (US)

(72) Inventors: Matthew E. Bintz, West Hartford, CT (US); Peter T. Schutte, Manchester, CT (US); Brian J. Schuler, West Hartford, CT (US); Anthony R. Bifulco, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 1102 days.

(21) Appl. No.: 14/422,368

(22) PCT Filed: Mar. 14, 2013

(86) PCT No.: PCT/US2013/031276
§ 371 (c)(1),
(2) Date: Feb. 19, 2015

(87) PCT Pub. No.: WO2014/031160
PCT Pub. Date: Feb. 27, 2014

(65) Prior Publication Data
US 2015/0218955 A1 Aug. 6, 2015

Related U.S. Application Data

(60) Provisional application No. 61/692,006, filed on Aug. 22, 2012.

(51) Int. Cl.
*F01D 9/04* (2006.01)
*F01D 5/28* (2006.01)
(Continued)

(52) U.S. Cl.
CPC ............ *F01D 5/288* (2013.01); *F01D 5/14* (2013.01); *F01D 5/20* (2013.01); *F01D 9/04* (2013.01);
(Continued)

(58) Field of Classification Search
None
See application file for complete search history.

(56) References Cited

U.S. PATENT DOCUMENTS 4,805,351 A * 2/1989 Dobson .................. B24B 19/14
29/889.7
4,874,031 A 10/1989 Janney
(Continued)

FOREIGN PATENT DOCUMENTS

EP 2458156 5/2012

OTHER PUBLICATIONS

Singapore Search Report and Written Opinion for Application No. 11201501228Y received Jan. 4, 2016.
(Continued)

*Primary Examiner* — Kayla Mccaffrey
(74) *Attorney, Agent, or Firm* — Carlson, Gaskey & Olds, P.C.

(57) ABSTRACT

A cantilevered airfoil includes, among other things, an airfoil having a body section and a tip, the body section extending in a first direction that is angled relative to a radial direction, the tip of the airfoil angled radially in a second direction relative to the body section.

19 Claims, 4 Drawing Sheets

(51) Int. Cl.
*F01D 11/12* (2006.01)
*F01D 5/20* (2006.01)
*F01D 5/14* (2006.01)

(52) U.S. Cl.
CPC ............ *F01D 11/122* (2013.01); *F01D 5/141* (2013.01); *F05D 2240/125* (2013.01); *F05D 2240/307* (2013.01); *Y02T 50/673* (2013.01)

(56) References Cited

U.S. PATENT DOCUMENTS

| | | | |
|---|---|---|---|
| 5,088,892 | A | 2/1992 | Weingold et al. |
| 5,167,489 | A | 12/1992 | Nadia et al. |
| 6,290,465 | B1 | 9/2001 | Lammas et al. |
| 7,101,145 | B2 | 9/2006 | Tsuchiya et al. |
| 7,497,664 | B2 | 3/2009 | Walter et al. |
| 7,726,937 | B2 | 6/2010 | Baumann et al. |
| 7,794,201 | B2 * | 9/2010 | Burton .................... F01D 5/141 29/889.21 |
| 2005/0169761 | A1 | 8/2005 | Dube et al. |
| 2008/0152501 | A1 | 6/2008 | Greim et al. |
| 2008/0213098 | A1 | 9/2008 | Neef et al. |
| 2010/0119366 | A1 * | 5/2010 | Bushnell ............... F04D 29/544 415/208.2 |
| 2010/0150729 | A1 | 6/2010 | Kirchner et al. |
| 2011/0081252 | A1 | 4/2011 | Li |
| 2012/0057981 | A1 | 3/2012 | Nash et al. |

OTHER PUBLICATIONS

International Search Report, dated Dec. 17, 2013.
Extended European Search Report for European Application No. 13830598.2 dated Nov. 2, 2015.
Malaysian Search Report for Malaysian Patent Application No. PI 2015000199 dated Sep. 28, 2018.

* cited by examiner

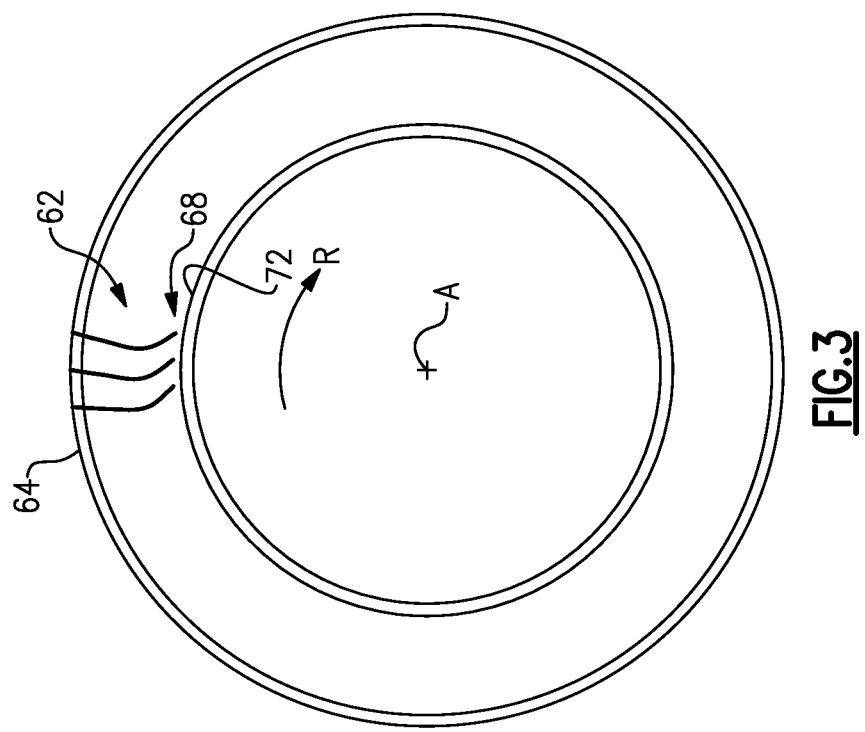
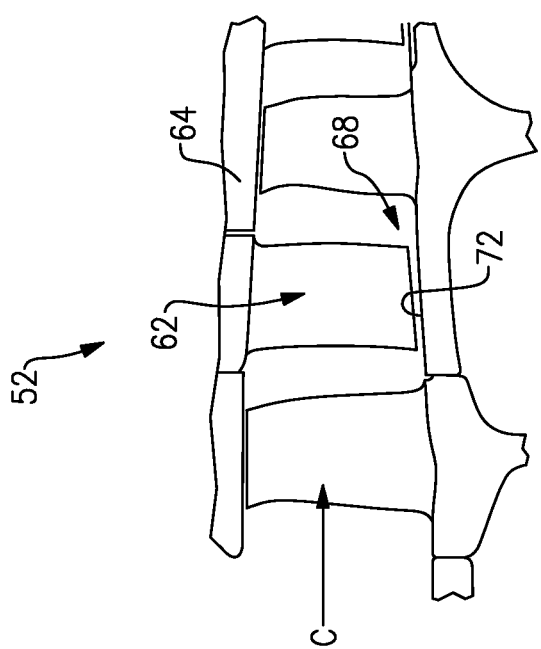

COMPLAINT CANTILEVERED AIRFOIL

CROSS-REFERENCE TO RELATED APPLICATIONS

This application claims priority to U.S. Provisional Application No. 61/692,006, which was filed on 22 Aug. 2012 and is incorporated herein by reference.

BACKGROUND

This disclosure relates generally to airfoils and, more particularly, to cantilevered airfoils.

Turbomachines, such as gas turbine engines, typically include a fan section, a compression section, a combustion section, and a turbine section. Turbomachines may employ a geared architecture connecting the portions of the compression section to the fan section.

At least the compression section and the turbine section include arrays of airfoils distributed annularly about an axis of the turbomachine. Tips of the airfoils may seal and rub against associated seal lands during operation. The seal lands may rotate relative to the tips of the airfoils in some examples, such as when the airfoils are cantilevered airfoils (or stators). High rubbing loads between the seal lands and the tips may cause damage. High rubbing loads between the seal lands and the tips may produce significant thermal energy, which can cause excessive fatigue damage.

SUMMARY

A cantilevered airfoil according to an exemplary aspect of the present disclosure includes, among other things, an airfoil having a body section and a tip, the body section extending in a first direction that is angled relative to a radial direction, the tip of the airfoil angled radially in a second direction relative to the body section.

In another non-limiting embodiment of the foregoing cantilevered airfoil, the tip is configured to seal against a seal land that rotates relative to the airfoil in a rotational direction.

In another non-limiting embodiment of any of the foregoing cantilevered airfoils, the airfoil has a lean that is from −9 to +10 degrees.

In another non-limiting embodiment of any of the foregoing cantilevered airfoils, the first direction includes a circumferential component that is opposite the rotational direction, and the second direction includes a circumferential component that is the same as the rotational direction.

In another non-limiting embodiment of any of the foregoing cantilevered airfoils, the body section is secured to a casing, and an angle between the first direction and the casing is from 0 to 52 degrees.

In another non-limiting embodiment of any of the foregoing cantilevered airfoils, the tip extends from the body section in a second direction, and an angle between the second direction and a seal land is from 32 to 58 degrees.

In another non-limiting embodiment of any of the foregoing cantilevered airfoils, the first direction extends through a centroid of a radially outermost section of the airfoil, and the second direction extends through a centroid of a radially innermost section of the airfoil.

In another non-limiting embodiment of any of the foregoing cantilevered airfoils, the cantilevered airfoil has a tip dihedral angle.

In another non-limiting embodiment of any of the foregoing cantilevered airfoils, the tip dihedral angle is from 0 to 45 degrees.

In another non-limiting embodiment of any of the foregoing cantilevered airfoils, the tip is coated with an insulative coating, an abradable coating, or both.

A gas turbine engine according to another exemplary aspect of the present disclosure includes, among other things, an array of cantilevered airfoils, each of the cantilevered airfoils having a body section and a tip, the body sections extending in a first direction that is angled relative to a radial direction, the tip of the airfoil angled radially in a second direction relative to the body section, a seal land, wherein the cantilevered airfoils are configured to rotate relative to the seal land.

In another non-limiting embodiment of the foregoing gas turbine engine, a geared architecture rotatably couples a fan drive turbine and a fan to rotate the fan at a different speed than the fan drive turbine.

In another non-limiting embodiment of any of the foregoing gas turbine engines, the cantilevered airfoils each have a lean that is from −9 to +10 degrees.

In another non-limiting embodiment of any of the foregoing gas turbine engines, the first direction includes a circumferential component that is opposite the rotational direction, and the second direction includes a circumferential component that is the same as the rotational direction.

In another non-limiting embodiment of any of the foregoing gas turbine engines, the first direction extends through a centroid of a radially outermost section of the airfoil, and the second direction extends through a centroid of a radially innermost section of the airfoil.

In another non-limiting embodiment of any of the foregoing gas turbine engines, the cantilevered airfoil has a tip dihedral angle.

In another non-limiting embodiment of any of the foregoing gas turbine engines, the tip is coated with an insulative coating, an abradable coating, or both.

A example method of tuning a cantilevered airfoil according to another exemplary aspect of the present disclosure includes, among other things, providing a cantilevered airfoil having a body section and a tip, the body sections extending in a first direction that is angled relative to a radial direction, the tip of the airfoil angled radially in a second direction relative to the body section.

In another non-limiting embodiment of the foregoing method, the method includes rotating a seal land relative to the cantilevered airfoil.

In another non-limiting embodiment of the foregoing method, the first direction includes a circumferential component that is opposite the rotational direction, and the second direction includes a circumferential component that is the same as the rotational direction.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 2 shows a section view of a cantilevered airfoil and associated seal land of the FIG. 1 turbomachine.

FIG. 3 shows a highly schematic view of a selected portion of an array of cantilevered airfoils.

DETAILED DESCRIPTION

Figure 1:
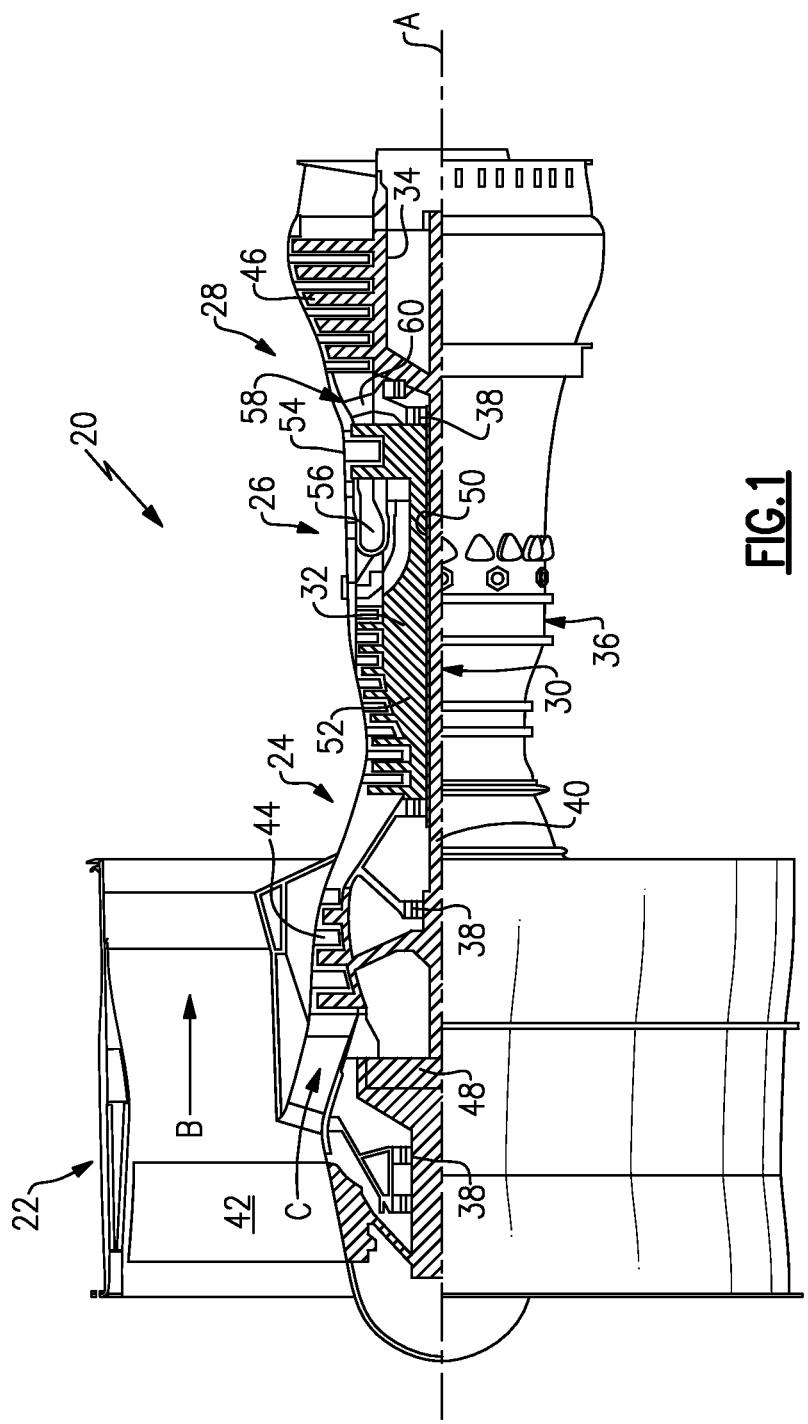
FIG. 1 shows a schematic view of an example turbomachine.
Figure 4:
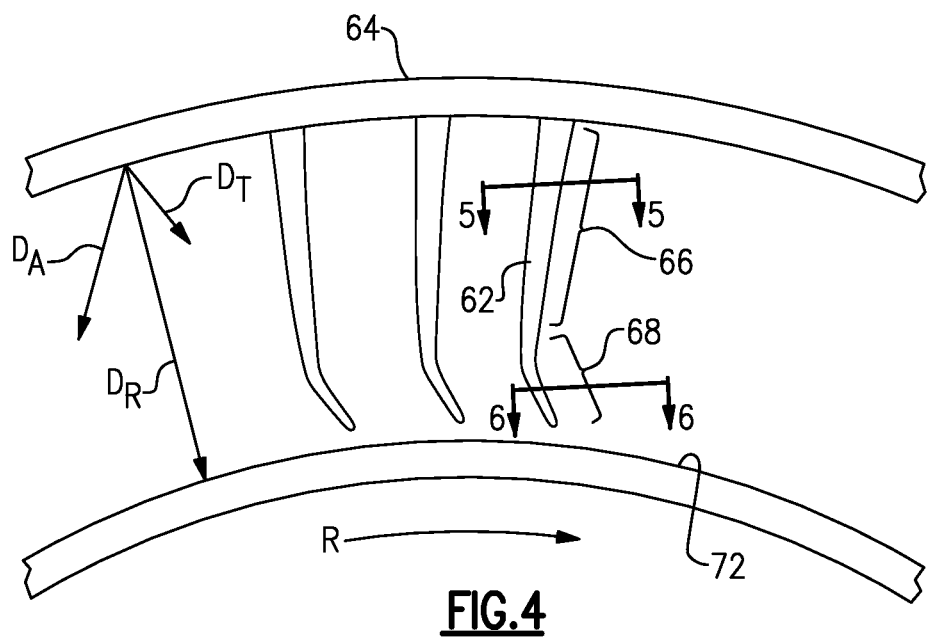
FIG. 4 shows a close up view of a portion of FIG. 3.
Figure 5:
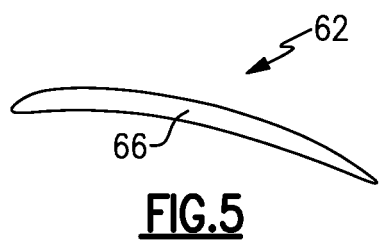
FIG. 5 shows a section view at line 5-5 in FIG. 4.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring to FIGS. 2 to 6 with continuing reference to FIG. 1, the engine 20 includes a cantilevered airfoil 62. The cantilevered airfoil 62 is one of an array of cantilevered airfoils 62 distributed annularly about the axis A. For clarity and ease of reference, the Figures do not show the entire array.

The example cantilevered airfoil 62 is mounted to a relatively static casing 64 within the high-pressure compressor 52. The cantilevered airfoil 62 is in another area of the engine 20 in other examples, such as the low pressure compressor 44, the high pressure turbine 54, or the low pressure turbine 46

The example cantilevered airfoil 62 is shown in connection with the engine 20, which includes the geared architecture 48. In other examples, the cantilevered airfoil 62 could be used in a direct drive engine.

The example cantilevered airfoil 62 is a stator that extends from the casing 64 across a core flowpath of the engine 20. The cantilevered airfoil 62 includes a body section 66 and a tip 68. In some of the Figures, size, spacing, and positioning of the tip 68 is exaggerated relative to the body section 66 for clarity and ease of reference.

A seal land 72 is mounted to a rotor portion of the high-pressure compressor 52. During operation of the engine 20, the seal land 72 rotates relative to the cantilevered airfoil 62. In this example, the seal land 72 rotates in a direction R relative to the cantilevered airfoil 62.

The tip 68 of the cantilevered airfoil 62 seals (and can rub) against the seal land 72 during operation. The seal land 72 can be coated with an insulating or abrasive material. The coating material can be a smooth coating, an insulative coating, and abrasive coating, a coating that is abradable relative to the tip 68, or some combination of these.

The tip 68 may be thinned relative to other portions of the cantilevered airfoil 62. The tip 68 could be bare or coated with a coating, such as an abradable coating.

The body section 66 of the cantilevered airfoil 62 extends initially from the casing 64 in a first direction $D_A$, which is angled relative to a radial direction $D_R$. The direction $D_A$ thus has a circumferential component and is not exclusively radial relative to the axis A. In this example, the direction $D_A$ has a circumferential component that is opposite the direction of rotation R. That is, the direction $D_A$ extends circumferentially opposite the direction of rotation R.

As the cantilevered airfoil 62 initially extend from the casing 64 in a direction that is angled relative to the radial direction $D_A$, the cantilevered airfoils 62 are considered to "lean." Lean can be positive or negative where positive lean of the cantilevered airfoils 62 is in the direction against rotation of the seal land 72 and negative lean of the cantilevered airfoils 62 is in the direction with rotation of the seal land 72.

Notably, prior art airfoils that are oriented and stacked along a radial line, or leaned along their entire length positively against the rotation of the seal land 72, will present as very stiff upon contact with the rotating seal land 72. Such cantilevered airfoils will generate large rubbing forces and a pawl-type interaction causing chatter and unstable rubbing conditions. The high rub loads generate high levels of thermal energy at the rub interface and both can be damaging to the structural integrity of the stator or seal land on the rotor. The high rub loads and high thermal energy loads can be addressed by spacing the airfoil further from the seal land. However, this approach may compromise stability and/or performance.

The example cantilevered airfoil 62 is designed to soften interaction with the seal land 72 and to facilitate minimum contact forces between the tip 68 and the seal land 72. The disclosed examples, utilize leaning, bowing, thickening, or some combination of these to soften interaction between the tip 68 and the seal land 72.

In one example, the tip 68 of the cantilevered airfoil 62 extends in a direction $D_T$, which has a circumferential component extending in the same direction as the direction of rotation R. Angling the tip 68 in the direction $D_T$ softens interaction between the tip 68 and the seal land 72. Softening interaction between the tip 68 and the seal land 72 reduces the radial spring rate of the tip 68 and inhibits pawling of the cantilevered airfoil 62 into the seal land 72.

Figure 6:
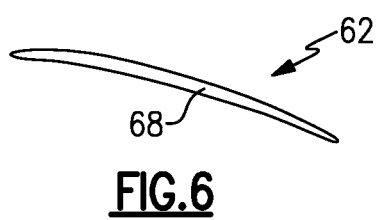
FIG. 6 shows a section view at line 6-6 in FIG. 4.
Figure 7:
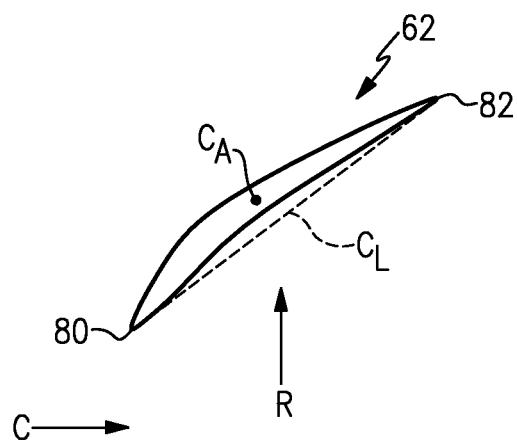
FIG. 7 shows a partially schematic definition of an airfoil.
Figure 8:
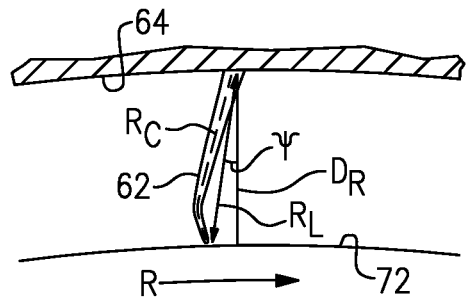
FIG. 8 shows a partially schematic definition of an airfoil lean.

The example cantilevered airfoil 62 extends from the casing 64, and a cross-sectional thickness of the cantilevered airfoil 62 gradually decreases moving away from the casing 64. That is, the cross-sectional area of the cantilevered airfoil 62 closer to the casing 64 (FIG. 5) is greater than the cross-sectional area of the cantilevered airfoil 62 further from the casing 64 (FIG. 6).

In other examples, the lateral thickness of the cantilevered airfoil 62 can be reduced or increased in one or more of the radial sections. In this example, the thickness at the tip 68 is reduced as much as structurally possible while providing a relatively aerodynamic airfoil and relatively compliant tip 68.

Referring now to FIGS. 7-10 with continuing reference to FIGS. 2-6, the example cantilevered airfoils 62 incorporate specific design features utilized to improve interaction between the cantilevered airfoils 62 and the rotating seal land 72.

In this example, lean is measured based on the offset angle $\psi$ of a reference line $R_L$ from the radial direction $D_R$. The reference line $R_L$ extends from the centroid at the radially outermost section of the cantilevered airfoil 62 to the centroid at the radially innermost section of the cantilevered airfoil 62. Generally, a centroid $C_A$ is the center of area of an airfoil section (FIG. 7) at a given radial position.

The body section 66 of the cantilevered airfoil 62 may have from −9 to +10 degrees of lean relative to the radial direction $D_R$. In some more specific examples, the lean is about 20 degrees.

In this example, the cantilevered airfoil 62 is considered to have a bow as the body section 66 of the cantilevered airfoil 62 is directed first in the direction $D_A$ and then bowed back at the tip 68 in the direction $D_T$.

Figure 9:
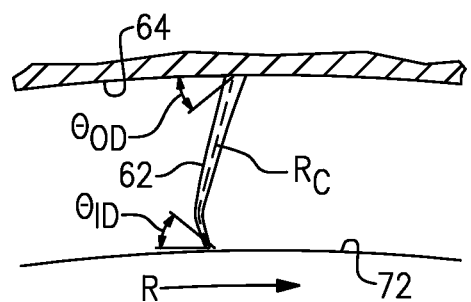
FIG. 9 shows a partially schematic definition of an airfoil bow.

Referring to FIG. 9, bow is defined along a reference line $R_C$, which extends through the centroids of the radial sections of the cantilevered airfoil 62. The reference line $R_C$ is also referred to as a stacking line. Bow is measured with reference to the sections of the casing 64 and the seal land 72 interfacing directly with the cantilevered airfoil 62. The radially outermost section of the cantilevered airfoil 62 interfaces with the casing 64, and the radially innermost section of the cantilevered airfoil 62 interfaces with the seal land 72. The angles $\theta_{OD}$ and $\theta_{ID}$ help quantify the amount of bow.

In some examples, the practical design ranges for $\theta_{OD}$ is up to about 45 degrees, and for $\theta_{ID}$ is up to about 45 degrees. In some more specific examples, $\theta_{OD}$ is from 0 to 52 degrees and $\theta_{ID}$ is from 32 to 58 degrees.

Figure 10:
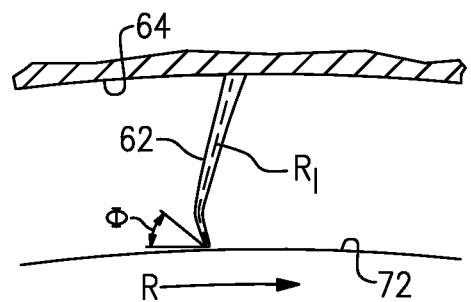
FIG. 10 shows a partially schematic definition of an airfoil dihedral.

Referring to FIG. 10, a tip dihedral angle 1 is defined along a reference line $R_L$ at a leading edge 80 of the airfoil 62 and perpendicular to a chord line $C_L$, which extends from the leading edge 80 to the trailing edge 82. The tip dihedral angle $\Phi$ between the cantilevered airfoil 62 and the tips 68 is less than or equal to 45 degrees. An example of the tip dihedral angle $\Phi$ may be found in U.S. Pat. No. 7,726,937, the entirety of which is incorporated herein by reference.

Features of the disclosed examples include a cantilevered airfoil having features that soften interaction with a seal land and reduced thermal energy generation. The cantilevered airfoils have stabilized and reduced rub interaction loads relative to prior art designs duct to the anti-pawl (anti-chatter) nature of the disclosed examples. The incorporation of three-dimensional aerodynamic parameters, such as aerodynamic lean, bow, tip dihedral, and thinning, facilitates the stabilization and load reduction. Tuning to achieve desired performance is also possible by varying these parameters Thinning of the cantilevered airfoils, in particular, reduces stator spring rate, interaction loads, heat generation, and material degradation of the rotor.

Although an example embodiment has been disclosed, a worker of ordinary skill in this art would recognize that certain modifications would come within the scope of this disclosure. For that reason, the following claims should be studied to determine the scope and content of this disclosure.

We claim:

1. A cantilevered airfoil, comprising:
an airfoil having a body section and a tip, the body section extending in a first direction that is angled relative to a radial direction, the tip of the airfoil angled radially in a second direction relative to the body section, wherein a centroid at the radially outermost section of the airfoil is circumferentially offset from a centroid at the radially innermost section of the airfoil such that the airfoil has a lean relative to the radial direction, the airfoil a cantilevered airfoil.

2. The cantilevered airfoil of claim 1, wherein the tip is configured to seal against a seal land that rotates relative to the airfoil in a rotational direction.

3. The cantilevered airfoil of claim 1, wherein the airfoil has a lean that is about 20 degrees.

4. The cantilevered airfoil of claim 1, wherein the first direction includes a circumferential component that is opposite the rotational direction, and the second direction includes a circumferential component that is the same as the rotational direction.

5. The cantilevered airfoil of claim 4, wherein the body section is secured to a casing, and an angle between the first direction and the casing is from 0 to 52 degrees.

6. The cantilevered airfoil of claim 4, wherein the tip extends from the body section in a second direction, and an angle between the second direction and a seal land is from 32 to 58 degrees.

7. The cantilevered airfoil of claim 1, wherein the first direction extends through a centroid of a radially outermost section of the airfoil, and the second direction extends through a centroid of a radially innermost section of the airfoil.

8. The cantilevered airfoil of claim 1, wherein the airfoil has a tip dihedral angle.

9. The cantilevered airfoil of claim 8, wherein the tip dihedral angle is from 0 to 45 degrees.

10. The cantilevered airfoil of claim 1, wherein the tip is coated with an insulative coating, an abradable coating, or both.

11. A gas turbine engine, comprising:
an array of cantilevered airfoils, each of the cantilevered airfoils having a body section and a tip, the body sections extending in a first direction that is angled relative to a radial direction, the tip of the airfoil angled radially in a second direction relative to the body section, wherein a centroid at the radially outermost section of each cantilevered airfoil is circumferentially offset from a centroid at the radially innermost section of the same cantilevered airfoil such that the cantilevered airfoils each have a lean relative to the radial direction; and
a seal land, wherein the seal land is configured to rotate relative to the cantilevered airfoils.

12. The gas turbine engine of claim 11, further comprising a geared architecture rotatably coupling a fan drive turbine and a fan to rotate the fan at a different speed than the fan drive turbine.

13. The gas turbine engine of claim 11, wherein the cantilevered airfoils each have a lean that is 20 degrees.

14. The gas turbine engine of claim 11, wherein the first direction includes a circumferential component that is opposite the rotational direction, and the second direction includes a circumferential component that is the same as the rotational direction.

15. The gas turbine engine of claim 11, wherein, for each of the cantilevered airfoils, the first direction extends through the centroid at the radially outermost section of the cantilevered airfoil, and the second direction extends through the centroid at the radially innermost section of the cantilevered airfoil.

16. The gas turbine engine of claim 11, wherein the cantilevered airfoils each have a tip dihedral angle.

17. The gas turbine engine of claim 11, wherein the tip is coated with an insulative coating, an abradable coating, or both.

18. A method of tuning a cantilevered airfoil, comprising:
providing a cantilevered airfoil having a body section and a tip, the body section extending in a first direction that is angled relative to a radial direction, the tip of the airfoil angled radially in a second direction relative to the body section wherein a centroid at the radially outermost section of the cantilevered airfoil is circumferentially offset from a centroid at the radially innermost section of the cantilevered airfoil such that the cantilevered airfoil has a lean relative to the radial direction; and
rotating a seal land relative to the cantilevered airfoil.

19. The method of claim 18, wherein the first direction includes a circumferential component that is opposite the rotational direction, and the second direction includes a circumferential component that is the same as the rotational direction.

* * * * *